(12) United States Patent
Sahlin et al.

(10) Patent No.: US 9,215,001 B2
(45) Date of Patent: Dec. 15, 2015

(54) PREFILTERING IN MIMO RECEIVER

(71) Applicant: Telefonaktiebolaget L M Ericsson (publ), Stockholm (SE)

(72) Inventors: Henrik Sahlin, Mölnlycke (SE); Miguel Lopez, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/430,256

(22) PCT Filed: Sep. 24, 2012

(86) PCT No.: PCT/SE2012/051005
§ 371 (c)(1),
(2) Date: Mar. 23, 2015

(87) PCT Pub. No.: WO2014/046584
PCT Pub. Date: Mar. 27, 2014

(65) Prior Publication Data
US 2015/0249493 A1 Sep. 3, 2015

(51) Int. Cl.
*H04B 7/08* (2006.01)
*H04B 7/04* (2006.01)
*H04L 1/00* (2006.01)

(52) U.S. Cl.
CPC ............ *H04B 7/0854* (2013.01); *H04B 7/0413* (2013.01); *H04B 7/0456* (2013.01); *H04L 1/0052* (2013.01); *H04L 1/0054* (2013.01)

(58) Field of Classification Search
USPC ............... 375/260, 267, 219, 340, 285, 367; 702/190, 196, 189
See application file for complete search history.

(56) References Cited

U.S. PATENT DOCUMENTS

| 6,018,317 A | 1/2000 | Dogan et al. |
| 6,185,258 B1 * | 2/2001 | Alamouti et al. ............. 375/260 |

(Continued)

FOREIGN PATENT DOCUMENTS

| GB | 2453776 A | 4/2009 |
| WO | 2007019681 A1 | 2/2007 |
| WO | 2008038110 A2 | 4/2008 |

OTHER PUBLICATIONS

3GPP, "3rd Generation Partnership Project; Technical Specification Group GSM/EDGE Radio Access Network; Physical layer on the radio path; General description (Release 12)", 3GPP TS 45.001 V12.1.0, Nov. 2014, 1-44.

(Continued)

*Primary Examiner* — Eva Puente
(74) *Attorney, Agent, or Firm* — Patent Portfolio Builders, PLLC

(57) ABSTRACT

Data signals transmitted by a plurality of transmitting antennas over a radio channel are demodulated. The method comprises receiving (202) on a plurality of receiving antennas, a first data signal, a reference signal and a second data signal, the contents of the reference signal being known a priori to the receiver. The contents of the reference signal are used for calculating (204) an estimated polynomial channel matrix and a time reversed version of the same. Polynomial pre-filter matrices are calculated (206, 208) by a decomposition of the estimated polynomial channel matrices into a respective product of a paraunitary polynomial matrix and an upper triangular polynomial matrix with minimum phase filters on its main diagonal, where the polynomial pre-filter matrices are obtained by calculating the paraconjugate of the paraunitary polynomial matrices. The received data signals are demodulated (212) where the received data signals are multiplied with the calculated polynomial pre-filter matrices.

15 Claims, 5 Drawing Sheets

(56) References Cited

U.S. PATENT DOCUMENTS

| | | | |
|---|---|---|---|
| 6,215,983 B1 | 4/2001 | Dogan et al. | |
| 6,826,226 B1 | 11/2004 | Sahlin et al. | |
| 8,116,399 B2* | 2/2012 | Gan et al. | 375/267 |
| 8,942,335 B2* | 1/2015 | Al-Dhahir et al. | 375/367 |
| 2005/0141624 A1 | 6/2005 | Lakshmipathi et al. | |
| 2007/0049232 A1 | 3/2007 | Wu et al. | |
| 2010/0150274 A1* | 6/2010 | Dai et al. | 375/340 |
| 2010/0232479 A1* | 9/2010 | Kim | 375/219 |
| 2012/0114060 A1* | 5/2012 | Zangi et al. | 375/285 |

OTHER PUBLICATIONS

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.4.0, Dec. 2014, 1-124.

Al-Dhahir, Naofal, "Overview and Comparison of Equalization Schemes for Space-Time-Coded Signals with Application to EDGE", IEEE Transactions on Signal Processing, vol. 50, No. 10, Oct. 2002, 2477-2488.

Brandt, Rasmus et al., "Wideband MIMO Channel Diagonalization in the Time Domain", 2011 IEEE 22nd International Symposium on Personal, Indoor and Mobile Radio Communications, 1958-1962.

Cescato, Davide et al., "QR Decomposition of Laurent Polynomial Matrices Sampled on the Unit Circle", IEEE Transactions on Information Theory, vol. 56, No. 9, Sep. 2010, 4754-4761.

Davies, Martin et al., "A Polynomial QR Decomposition Based Turbo Equalization Technique for Frequency Selective MIMO Channels", IEEE Vehicular Technology Conference, 2009, 1-5.

De Jong, Yvo L. et al., "Reduced-Complexity Time-Domain Equalization for Turbo-MIMO Systems", IEEE Transactions on Communications, vol. 55, No. 10, Oct. 2007, 1878-1883.

Foster, Joanne et al., "A Novel Algorithm for Calculating the QR Decomposition of a Polynomial Matrix", IEEE International Conference on Acoustics, Speech, and Signal Processing, Apr. 19-24, 2009, 3177-3180.

Foster, Joanne et al., "A Polynomial Matrix QR Decomposition with Application to MIMO Channel Equalisation", IEEE 2007, Forty-First Asilomar Conference on Signals, Systems and Computers, 1379-1383.

Foster, Joanne et al., "An Algorithm for Calculating the QR and Singular Value Decompositions of Polynomial Matrices", IEEE Transactions on Signal Processing, vol. 58, No. 3, Mar. 2010, 1263-1274.

Fujii, Masaaki, "Pre-Whitening QR-Decomposition Maximum Likelihood Detection for Co-channel Interference Rejection in MIMO Systems", IEICE Trans. Commun., vol. E92-B, No. 7, Jul. 2009, 2529-2532.

Gao, Xiqi et al., "On Factorization of M-Channel Paraunitary Filterbanks", IEEE Transactions on Signal Processing, vol. 49, No. 7, Jul. 2001, 1433-1446.

Gerstacker, Wolfgang H. et al., "Diversity Interference Cancellation Using Prefiltering and Reduced-State MIMO Equalization", IEEE ICASSP, 2004, 813-816.

Hansen, Morten et al., "On Sphere Detection and Minimum-Phase Prefiltered Reduced-State Sequence Estimation", IEEE Communications Society, GLOBECOM, 2007, 4237-4241.

Ramésh, R. et al., "Prefilter Design for Low-Complexity Equalization of MIMO Systems", IEEE 59th Vehicular Technology Conference, May 17-18, 2004, 871-875.

Rota, Ludwig et al., "Blind MIMO Equalization Under Paraunitary Constraint", Rapport de recherche, I3S/RR-2002-35-FR, Sep. 2002, 1-19.

Sanguinetti, Luca et al., "Non-linear Pre-Filtering Techniques for MC-CDMA Downlink Transmissions", IEEE Communications Society GLOBECOM, 2005, 3201-3205.

Unknown, Author, "Voice Capacity Evolution with Orthogonal Sub Channels", Nokia Siemens Networks, Nokia Corporation, 3GPP TSG GERAN #36, GP-071792, Vancouver, Canada., Nov. 12-16, 2007, 1-12.

* cited by examiner

PREFILTERING IN MIMO RECEIVER

TECHNICAL FIELD

The field of the present disclosure is that of controlling a multiple input multiple output, MIMO, receiver. Specifically, calculations associated with determining the characteristics of the radio channel between a transmitter and the MIMO receiver in order to improve performance when demodulating received signals.

BACKGROUND

In mobile radio communication systems that use Multi-User MIMO, MU-MIMO, several users are scheduled to transmit simultaneously during the same time and frequency interval. These users can be distinguished by allocating different, and preferably orthogonal, reference signals to them such that all channels from all transmit antennas to all receive antennas can be estimated. The reference signals, or training sequence, are sequences known to the receiver and they are transmitted together with user signals such that the receiver can estimate distortions of the received signal after it is transmitted.

MU-MIMO forms part of, e.g., the third generation partnership project, 3GPP, standards including the global system for mobile communication, GSM, as well as the long term evolution, LTE, standard.

A radio communication between a UE and a base-station will be affected by multi path propagation, fading, frequency errors, round trip times etc. This communication channel is often referred to as an air interface, and causes bit and block errors on information transmitted. A receiver is designed in order to reduce bit error and block error rates, which among others, includes channel estimation, demodulation and decoding blocks. Other processing blocks commonly used in uplink receivers includes spatial and temporal whitening and pre-filtering, as illustrated in FIG. 3.

In order to make it possible to reduce such bit error and block error rates for data bursts in the communication between a UE and a base-station, so-called training sequences are typically inserted into the data bursts. The training sequence is a sequence of information that is known to the receiver. This is inserted into a transmission slot together with user data such that the receiver can estimate distortions of the received signal after it has been transmitted. For example, the training sequence can be inserted in the middle of one burst with user data both prior to and subsequent to the training sequence. When equalizing the user data, the user data signals prior to and subsequent to the training sequence are usually equalized with Viterbi equalizers, one for the "prior to" data part and one for the "subsequent to" data part. The "prior to" data part is in the following description referred to as being associated with a "backward" direction and the "subsequent to" data part is in the following description referred to as being associated with a "forward" direction.

The received signal in a MIMO system with N transmitters and M receiver antennas subject to an ISI channel can be described as $$Y(n) = \sum_{k=0}^{L} H(k)S(n-k) + W(n) = H(z^{-1})S(n) + W(n) \quad (1)$$

where W(n) is a M×1 vector with additive noise and interference, S(n) is a N×1 vector with transmitted signals $$S(n) = [s_1(n)s_2(n)\ldots s_N(n)]^T \quad (2)$$

and $H(z^{-1})$ is an M×N channel matrix with polynomial entries in the unity delay operator $z^1$, i.e. $z^{-1}s(n)=s(n-1)$, such that the element in row i and column j equals $$h_{i,j}(z^{-1}) = h_{i,j,0} + h_{i,j,1}z^{-1} + h_{i,j,2}z^{-2} + \ldots + h_{i,j,L}z^{-L} \quad (3)$$

A polynomial in the unity delay operator is thus a compact description of a time invariant FIR filter.

Polynomial QR decomposition is described in the prior art:

J. Foster, J. McWhirter and J. Chambers, "*A polynomial matrix QR decomposition with application to MIMO channel equalization*", Forty-First Asilomar Conference on Signals, Systems and Computers, (ACSSC 2007), Pacific Grove, Calif., November 4-7, pp. 1379-1383, M. Davies, S. Lambotharan, and J. Foster, "*A polynomial QR decomposition based turbo equalization technique for frequency selective MIMO channels*", Proceedings of 2009 69th Vehicular Technology Conference (VTC 2009), Barcelona, Spain, 2009, and D. Cescato and H. Bölcskei, "*QR decomposition of Laurent polynomial matrices sampled on the unit circle*", presented at IEEE Transactions on Information Theory, 2010, pp. 4754-4761.

Using polynomial QR decomposition, as described in the prior art, of the channel matrix results in $$Q(z^{-1})R(z^{-1}) = H(z^{-1}) \quad (4)$$

where $R(z^{-1})$ is an upper triangular polynomial matrix of size N×N $$R(z^{-1}) = \begin{bmatrix} r_{1,1}(z^{-1}) & r_{1,2}(z^{-1}) & \ldots & r_{1,N}(z^{-1}) \\ 0 & r_{2,2}(z^{-1}) & & \vdots \\ \vdots & & \ddots & \\ 0 & \ldots & 0 & r_{N,N}(z^{-1}) \end{bmatrix} \quad (5)$$

and $Q(z^{-1})$ is a paraunitary polynomial matrix of size M×N. A matrix $Q(z^{-1})$ is a paraunitary polynomial matrix if $$Q(z^{-1})Q^{*T}(z) = I_M,$$

$$Q^{*T}(z)Q(z^{-1}) = I_N \quad (6)$$

where $Q^{*T}$ and $I^N$ are unitary matrices of size M and N, respectively. The paraconjugate of a matrix is defined as $$\tilde{Q}(z^{-1}) \triangleq Q^{*T}(z). \quad (7)$$

where $Q^{*T}(z)$ denotes a matrix with conjugate of the coefficients, $z^{-1}$ replaced by z and transpose of the matrix $Q(z^{-1})$. From (4) and (6) follows that a multiplication of (1) with $\tilde{Q}(z^{-1})$ results in $$Y_P(n) = \tilde{Q}(z^{-1})Y(n) = R(z^{-1})S(n) + \tilde{Q}(z^{-1})W(n) \quad (8)$$

i.e. a signal with upper triangular channel matrix $R(z^1)$. The multiplication with the polynomial matrix $\tilde{Q}(z^{-1})$ is referred to as a MIMO pre-filter.

Assume that the additive noise and interference W(n) is temporally white and uncorrelated between the antenna branches i.e.

$$E\{W(n)W^{*T}(n-m)\} = I_M \delta(m) \quad (9)$$

This can e.g. be accomplished by spatial-temporal whitening prior to (1), as illustrated by the whitening function 302 in FIG. 3. Since $\tilde{Q}(z^{-1})$ is paraunitary, the whiteness and uncorrelateness of the additive nose and interference in (8) is preserved i.e.

$$E\{\tilde{Q}(z^{-1})W(n)(\tilde{Q}(z)W(n-m)^{*T})\}=\tilde{Q}(z^{-1})\tilde{Q}(z)\cdot(m)= I_N\cdot\delta(m) \quad (10)$$

A turbo equalizer can now be used for equalization and demodulation of the transmitted symbols in S(n), e.g. as outlined in Davies et al.

A polynomial decomposition is proposed in Foster et al. which is based on Givens rotations. Here several iterations are needed in order for the QR decomposition to converge.

A polynomial QR-decomposition is also described in Cescato and Bölcskei. Here, the channel $H(\omega_n)=H(z^1)|_{z=e^{j\omega}n}$ is available for a number of discrete frequencies $\omega_n$. A QR-decomposition of these channel matrices is described such that an interpolation to any frequency is available.

The complexity of a demodulator typically increases with the length of the radio channel. In order to reduce computational complexity, a short channel model is beneficial. With a minimum phase channel model, most of the energy is concentrated in the first taps of the channel. However a polynomial QR decomposition as done in Foster et al. is based upon Givens rotations which do not guarantee minimum phase channel after pre-filtering.

SUMMARY

In order to mitigate at least some of the drawbacks as discussed above, there is provided in a first aspect a method in a radio receiver for demodulating data signals transmitted by a plurality of transmitting antennas over a radio channel. The method comprises receiving on a plurality of receiving antennas, at least a first data signal, a second data signal and a reference signal. The first data signal is received prior to the reference signal and the second data signal is received subsequent to the reference signal. The contents of the reference signal is known a priori to the receiver. Using the contents of the reference signal, an estimated polynomial channel matrix and a time reversed estimated polynomial channel matrix are then calculated. The estimated polynomial channel matrix is then decomposed, the decomposing comprising a joint calculation of a first decomposition of the estimated polynomial channel matrix into a product of a first paraunitary polynomial matrix and a first upper triangular polynomial matrix with minimum phase filters on its main diagonal, and a second decomposition of the time reversed estimated polynomial channel matrix into a product of a second paraunitary polynomial matrix and a second upper triangular polynomial matrix with said minimum phase filters on its main diagonal. A first polynomial pre-filter matrix is calculated as the paraconjugate of the first paraunitary polynomial matrix, and a second polynomial pre-filter matrix is calculated as the paraconjugate of the second paraunitary polynomial matrix. The received first data signal is demodulated where the received first data signal is time reversed and multiplied with the calculated first polynomial pre-filter matrix, and the received second data signal is demodulated where the received second data signal is multiplied with the calculated second polynomial pre-filter matrix.

In some embodiments, the calculation of the decomposition comprises:
assigning, to an auxiliary polynomial matrix, the estimated polynomial channel matrix,
assigning, to the first column of the first paraunitary polynomial matrix, a normalized version of the first column of the auxiliary polynomial matrix,
assigning, to the first column of the second paraunitary polynomial matrix, a normalized version of the time reversed first column of the auxiliary polynomial matrix, and
for each current column from a second column to a last column:
calculating projections of the current column of the auxiliary matrix on the previous columns of the first paraunitary polynomial matrix,
calculating a difference polynomial vector as the difference between the current column of the auxiliary matrix and a product of the calculated projections multiplied by the previous columns of the first paraunitary polynomial matrix, and
assigning, to the current column of the first paraunitary polynomial matrix, a normalized version of the calculated difference polynomial vector, and
assigning, to the current column of the second paraunitary polynomial matrix, a normalized version of the time reversed calculated difference polynomial vector.

In some embodiments, the calculation of the decomposition comprises:
assigning, to an auxiliary polynomial matrix, the elements of the estimated polynomial channel matrix, and for each current column from a first column to a last column:
assigning, to the current column of the first paraunitary polynomial matrix, a normalized version of the current column of the auxiliary polynomial matrix,
assigning, to the current column of the second paraunitary polynomial matrix, a normalized version of the time reversed current column of the auxiliary polynomial matrix,
calculating projections of the auxiliary polynomial matrix on the current column of the first paraunitary polynomial matrix,
updating the auxiliary polynomial matrix by subtracting a product of the current column of the first paraunitary polynomial matrix and the calculated projections from the auxiliary polynomial matrix.

In other words, MIMO pre-filtering in a receiver is provided which results in channel matrices that are upper triangular and with minimum phase filters on their main diagonals. A minimum phase polynomial has the following energy compaction property: for any the sum of the energy contained in the first k taps is larger than the energy contained in the first k taps of any other polynomial having the same spectrum. The polynomial coefficients correspond to channel tap values in the equalizer of a receiver in which the method is realized. Therefore, the MIMO pre-filters of the present disclosure reduce the channel to a triangular form while at the same time reshapes the diagonal entries by compacting the channel energy. Both triangularization and energy compaction are very useful properties in order to reduce the computational complexity of the demodulator of a receiver in which the method is realized. The calculation of the MIMO prefilters is performed for the forward direction (i.e. with respect to data subsequent to a training sequence) and the backward direction (i.e. with respect to data prior to a training sequence) within the same polynomial QR decomposition. Embodiments include those where the processing only includes one spectral factorization and one long division per layer in order to calculate the prefilters in both the forward and the backward directions.

Such a MIMO pre-filter is an essential component in many practical MIMO or MU-MIMO Joint Detection receivers. For example, it can be used in high performance joint detection UL and DL VAMOS receivers. Advantages that are provided by the present disclosure include the fact that it provides simultaneous triangularization and channel re-shaping for energy compaction. The latter property is a key in order to efficiently cope with ISI. Furthermore, low computational complexity is provided. More specifically, as will be elucidated further below, the calculations require only one spectral factorization and one long division per transmitted layer in order to calculate the pre-filter. Moreover, the calculations require only one spectral factorization and one long division per transmitted layer in order to calculate prefilters both for the forward and backward directions. The computational complexity of the joint calculation of the forward and backward prefilters is only a little more complex than the calculation of one single prefilter. It is to be noted that many of the algorithms available in the prior art are not practical for implementation in typical mobile communication terminal or radio base station digital signal processing hardware. The present disclosure provides algorithms that are readily implemented in fixed point digital signal processors.

In a second aspect there is provided a radio receiver for demodulating data signals transmitted by a plurality of transmitting antennas over a radio channel. The receiver comprises control and communication circuitry configured to perform the method as summarized above in relation to the first aspect.

In a third aspect there is provided a computer program product comprising software instructions that are configured, when executed in a processing device, to perform the method as summarized above in relation to the first aspect.

The effects and advantages of the second and third aspects correspond to those summarized above in connection with the first aspect.

DETAILED DESCRIPTION OF EMBODIMENTS

Figure 1:
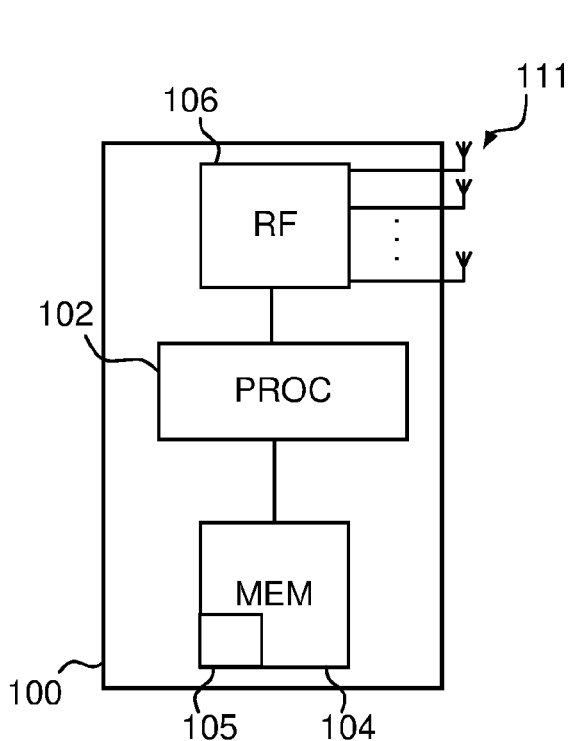
FIG. 1 schematically illustrates a radio receiver.

FIG. 1 illustrates schematically a MIMO enabled mobile communication terminal 100 comprising a processor 102, a memory 104, radio frequency, RF, receiving and transmitting circuitry 106 and a plurality of antenna elements 111. Radio communication via the antennas 111 is realized by the RF circuitry 106 controlled by the processor 102, as the skilled person will understand. The processor 102 makes use of software instructions 105 stored in the memory 104 in order to control all functions of the terminal 100, including the functions of receiver circuitry in the RF circuitry 106 to be described in detail below with regard to demodulation. In other words, at least the RF circuitry 106, the processor 102 and the memory 104 form parts of control and communication circuitry that is configured to control demodulation as summarized above and described in detail below. Further details regarding how these units operate in order to perform normal functions within a mobile radio communication system, are outside the scope of the present disclosure and are therefore not discussed further.

Figure 2:
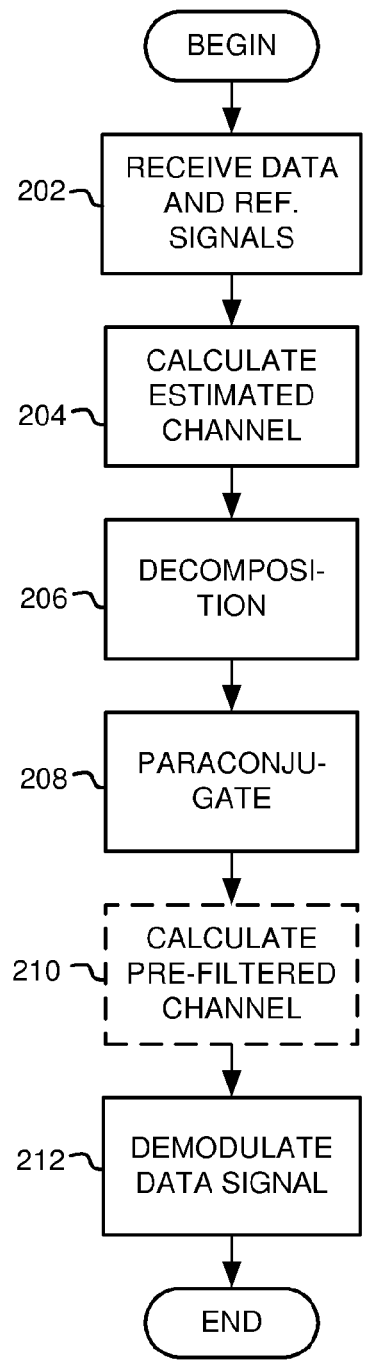
FIG. 2 is a flow chart of a method in a receiver.
Figure 3:
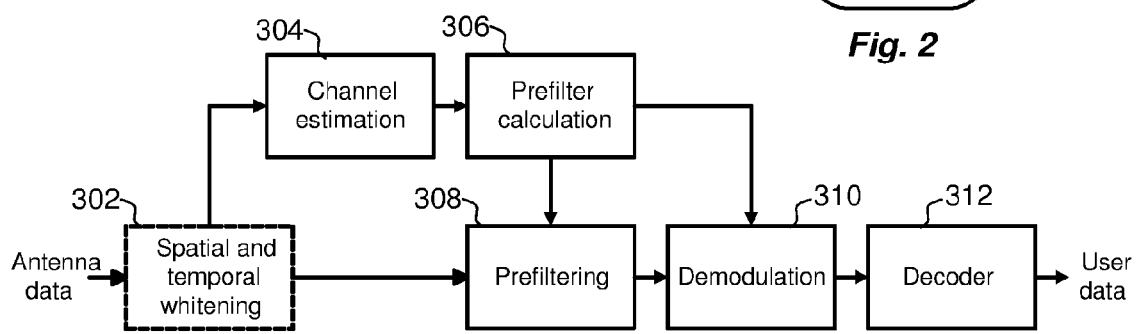
FIG. 3 illustrates schematically functional blocks of a radio receiver.

Turning now to FIG. 2 and FIG. 3, a method in a radio receiver for demodulating data signals transmitted by a plurality of transmitting antennas over a radio channel will be described.

In a reception step 202, data signals and a reference signal are received on a plurality of receiving antennas. Specifically, at least a first data signal, a second data signal and a reference signal is received. The first data signal is received prior to the reference signal and the second data signal is received subsequent to the reference signal. The contents of the reference signal are known a priori to the receiver. For example, in an implementation in a GSM system, the reference signal can be the training sequence that is transmitted in a data burst and in a LTE system implementation it can be the reference signals that form part of a sub-frame. In a calculation step 204, a calculation of an estimated polynomial channel matrix is made using the contents of the reference signal. Also, during the calculation step 204, a time reversed estimated polynomial channel matrix is calculated using the contents of the reference signal. The time reversal is done according to equation (12), which will be described below. The calculation of the estimated polynomial channel matrix is followed by a decomposition 206 of the estimated polynomial channel matrix. The decomposition is a joint decomposition that comprises calculating a first decomposition of the estimated polynomial channel matrix into a product of a first paraunitary polynomial matrix and a first upper triangular polynomial matrix with minimum phase filters on its main diagonal. The joint decomposition 206 further comprises calculation of a second decomposition of the time reversed estimated polynomial channel matrix into a product of a second paraunitary polynomial matrix and a second upper triangular polynomial matrix with the same minimum phase filters on its main diagonal as for the first upper triangular polynomial matrix.

The first and second polynomial pre-filter matrix are then calculated 208 as the respective paraconjugate of the first and second paraunitary polynomial matrix.

The received data signals are then demodulated in a demodulation step 212, where the received first data signal is time reversed and multiplied with the calculated second polynomial pre-filter matrix, and the received second data signal is multiplied with the calculated first polynomial pre-filter matrix.

A calculation can be made, in an optional third calculation step 210 prior to the demodulation step 212, of a respective first and second pre-filtered polynomial channel matrix by multiplying the estimated polynomial channel matrix with the first polynomial pre-filter matrix and the second polynomial pre-filter matrix, respectively, thereby making the respective first and second pre-filtered polynomial channel matrix upper triangular and with minimum phase filters on its main diagonal.

In such cases, the demodulation step 212 also includes using the first and the second pre-filtered polynomial channel matrix as the respective channel model in the demodulation of the time reversed first and the second data signal, respectively.

This method can be illustrated in a block function, as presented in FIG. 3. Antenna data, i.e. data signals and reference signals, are received and are subject to spatial and temporal whitening 302. The output of this whitening procedure is provided to a channel estimation function 304, which in turn provides output to a pre-filter calculation function 306. The output of the pre-filter calculation function 306 is used in a pre-filtering function 308 as well as in a demodulation function 310. The output from the demodulation function 310 is then decoded into user data in a decoder function 312.

Figure 4:
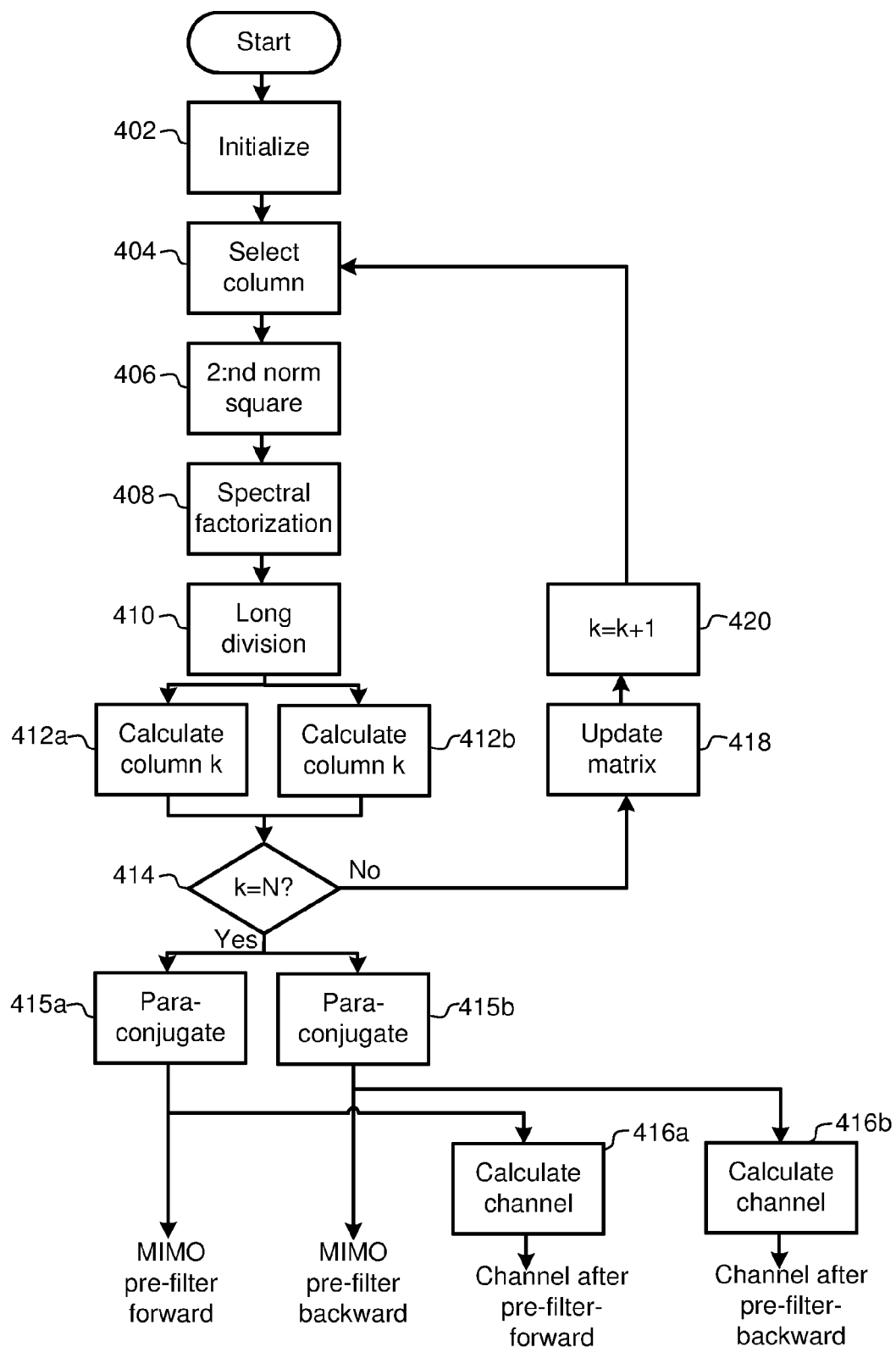
FIG. 4 is a flow chart of a method in a receiver.

Turning now to FIG. 4, a more detailed description will be given of examples of calculations of MIMO pre-filters. The calculations are based on polynomial QR-decomposition, spectral factorizations and long divisions, and the sequence of steps is as follows:

In an initialisation step 402, a column counter k is set to the first column.

In a column setting step 404, column k of the channel matrix is selected for processing.

In a first calculation step 406, the square of the second norm of one column is calculated.

In a second calculation step 408, spectral factorization is performed.

In a third calculation step 410, long division is performed.

In a fourth and fifth calculation step 412a, 412b, column k of a paraunitary polynomial matrix for the forward and backward direction, respectively, is calculated.

If all columns have been considered, as checked in a decision step 414, the paraunitary polynomial matrices for the forward and backward direction are available and used in a sixth and seventh calculation step 415a, 415b where the prefilter matrices are obtained as the paraconjugate of the respective paraunitary polynomial matrix obtained after step 414. The channel after pre-filter in the forward and backward direction is obtained in a eighth and ninth calculation step 416a, 416b respectively.

If it is found, in the checking step 414, that not all columns have been considered, preparations for processing the next column is performed in an updating step 418 where matrix values are updated in preparation for calculation of values for next column. The column counter k is then incremented in an increment step 420, whereupon the procedure returns to the column setting step 404.

That is, a prefilter in the forward direction, denoted by $\tilde{Q}_{fwd}(z^{-1})$, and a prefilter for the backward direction, $\tilde{Q}_{bwd}(z^{-1})$, are calculated.

The channels after prefilters are calculated as a polynomial multiplication between the calculated prefilters and the channel estimate. These channels, after prefiltering, are in theory equal to the upper triangular polynomial matrices $R_{fwd}(z^{-1})$ and $R_{bwd}(z^{-1})$ from the QR-decompositions. However, approximations, polynomial truncations and limited calculation accuracy impact the accuracy of the calculations of the MIMO prefilters $\tilde{Q}_{fwd}(z^{-1})$ and $\tilde{Q}_{bwd}(z^{-1})$. By using $\tilde{Q}_{fwd}(z^{-1})$ and $\tilde{Q}_{bwd}(z^{-1})$ on the received signal and on the channel matrix, these inaccuracies are included in the calculated channel after prefiltering. Furthermore, the matrix $R_{bwd}(z^1)$ does not need to be explicitly calculated within the method exemplified in FIG. 4.

With regard to the polynomial QR decomposition, it can be based upon a Classical Gram-Schmidt (CGS) procedure as well as being based on a Modified Gram Schmidt (MGS). These two exemplifying approaches will be described below. Descriptions of CGS and MGS algorithms for non-polynomial matrices can e.g. be found in Davies et al.

Both in CGS and MGS, spectral factorizations and long divisions are proposed to be used. A detailed description of the spectral factorizations will follow after the description of the CGS and MGS algorithms.

When multiplying polynomials, the polynomial degree of the result is the sum of the degrees of the involved polynomials. In both CGS and MGS, the degrees of the resulting polynomials increase with each new column of $\tilde{Q}_{fwd}(z^{-1})$ and $\tilde{Q}_{bwd}(z^{-1})$. Details regarding polynomial truncations are also described below for both CGS and MGS.

Referring to GSM as an example of a system in which the present invention can be realized, in a GSM time slot, the user data symbols are divided into two sequences; one to the left of (prior to) the training sequence and one to the right of (subsequent to) the training sequence. When demodulating the user data in the right half of the slot, the Viterbi equalizer starts at the training sequence and use the known training symbols to initiate the Viterbi. This is referred to as the forward direction. Also, when equalizing the left side symbols, the Viterbi starts at the training sequence and demodulate the symbols starting with the one closest to the training sequence. This is referred to as the backward or time reversed direction.

Denote the received signal in the forward direction for a MIMO system in (1) as $$Y_{fwd}(n) \triangleq Y(n) = H_{fwd}(z-1)S(n) + W(n). \tag{11}$$

When equalizing in the backward direction, the channel model is time reversed i.e.

$$Y_{bwd}(n) \triangleq \tag{12}$$

$$H_{bwd}(z^{-1})S_{bwd}(n) + W_{bwd}(n) = \underbrace{z^{-L}H_{fwd}(z)}_{H_{bwd}(z^{-1})}\underbrace{S(N_0 - n)}_{S_{bwd}(n)} + W(N_0 - n)$$

for some value $N_0$.

Figure 5A:
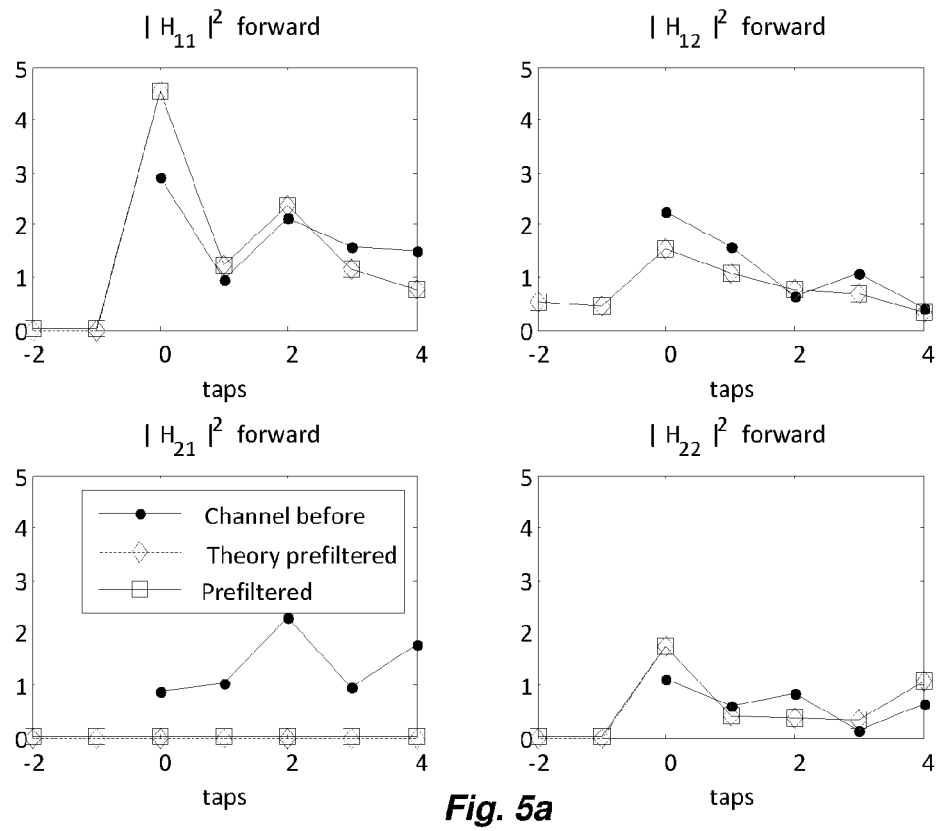
FIGS. 5a and 5b show graphs of radio channel characteristics.
Figure 5B:
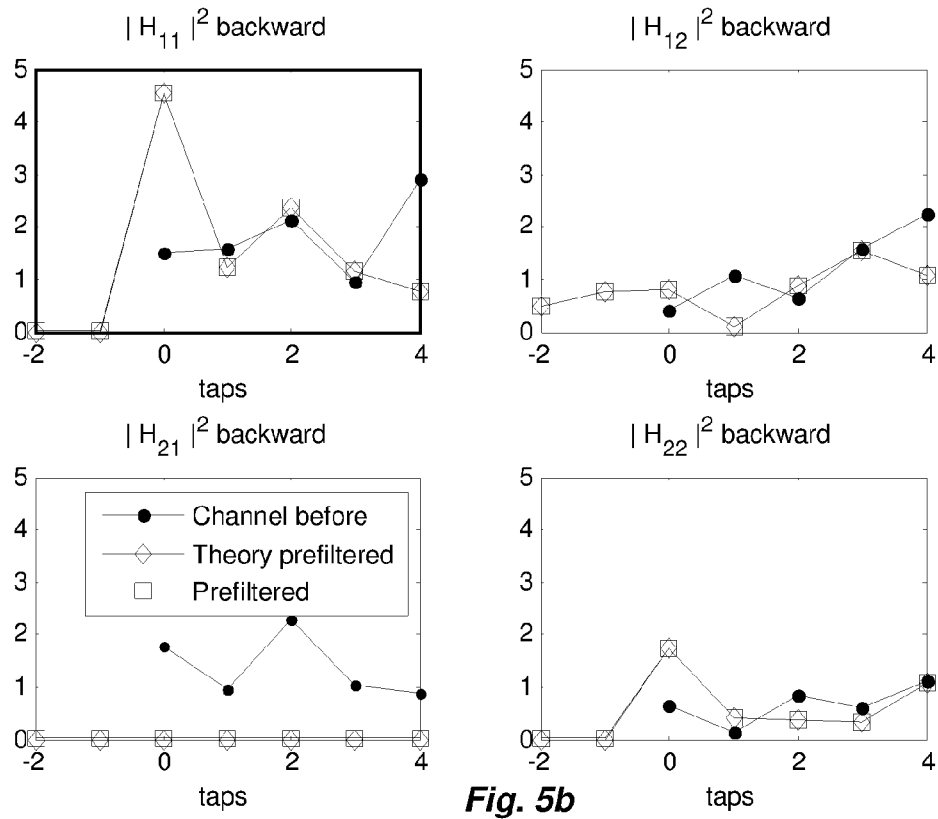
Figure 6A:
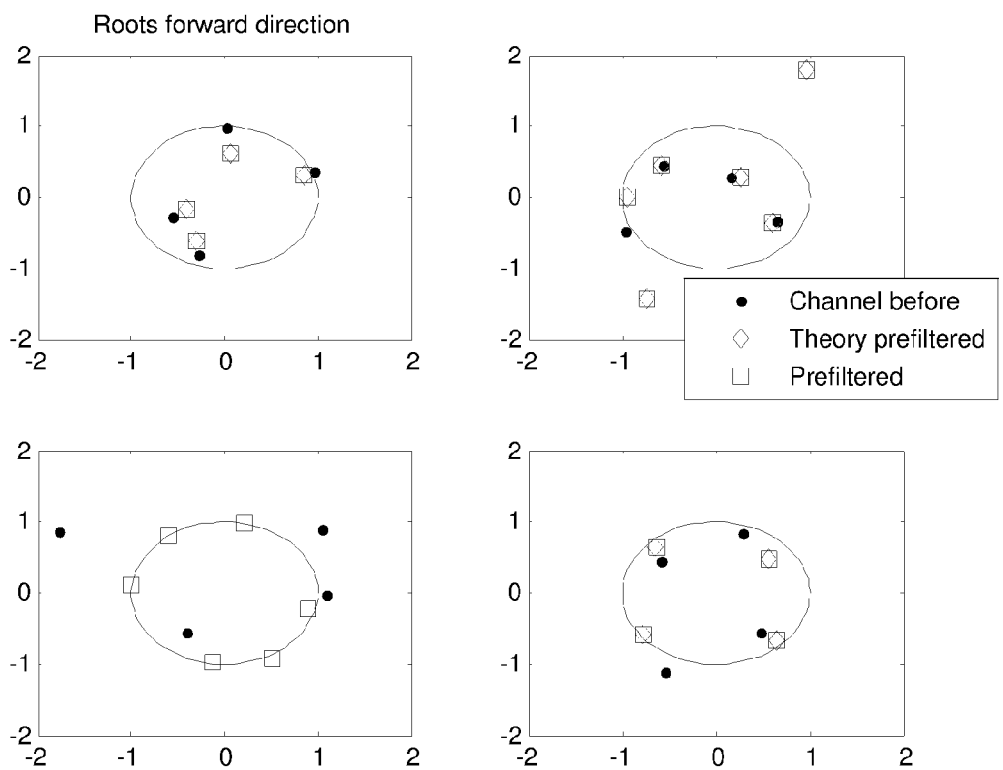
FIGS. 6a and 6b show graphs of radio channel characteristics.
Figure 6B:
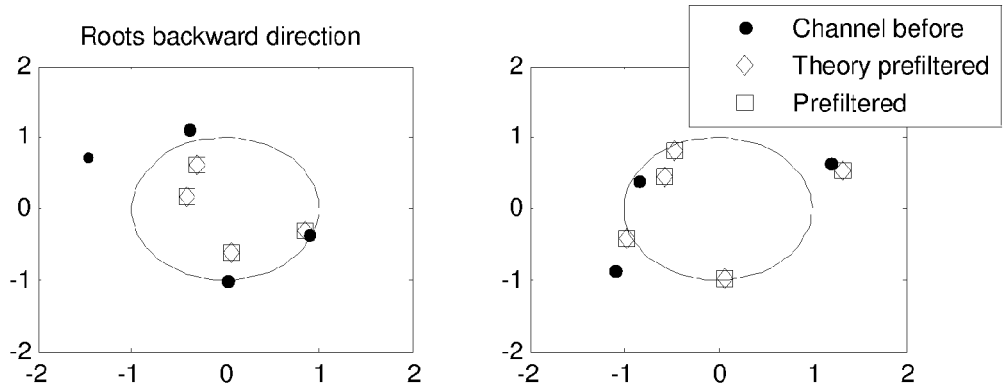
Figure 6B:
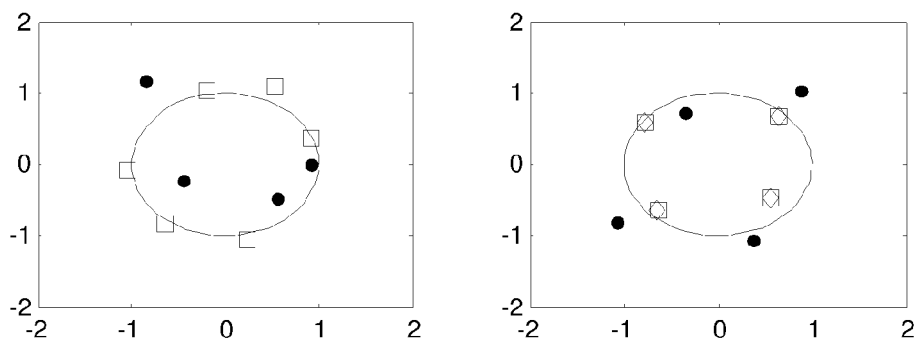

Illustrations of the channels for a system with two transmitters and two receiver antennas are given in FIGS. 5a and 5b. Here the channels in the forward direction are illustrated in FIG. 5a. These channels are time reversed in the backward direction as illustrated in FIG. 5b. The channels after prefiltering are also illustrated. Both in the forward and in the backward direction, the filters on the main diagonal are minimum-phase filters, i.e. the energy is concentrated to the first taps. This is also illustrated in FIGS. 6a and 6b where the roots of the channels are shown. The prefiltered channels on the main diagonal have all roots inside the unit circle, since these are minimum phase filters.

The channels above the main diagonal are not minimum phase after prefiltering, and can thus have roots both inside and outside the unit circle, see FIGS. 6a and 6b.

Furthermore, the prefiltered channels above the main diagonal might have non-causal values lager than zero, as illustrated in FIGS. 5a and 5b.

Figure 7:
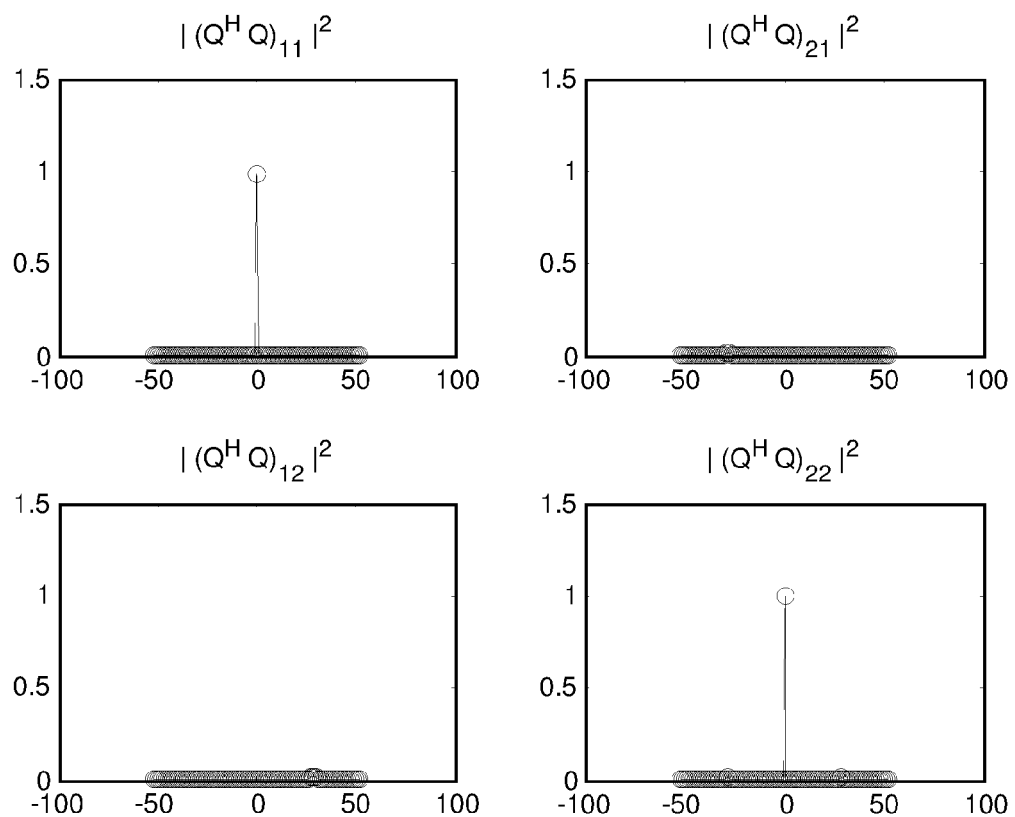
FIG. 7 shows graphs of radio channel characteristics.

An illustration of the whiteness of the noise after prefiltering is given in FIG. 7. Here, the elements of $$E\{\tilde{Q}_{fwd}(z^{-1})W(n)(\tilde{Q}_{fwd}(z)W(n-m))^{*T}\} = Q_{fwd}^{*T}(z^{-1})Q_{fwd}(z)\cdot\delta(n) = I\cdot\delta(n). \tag{13}$$

are illustrated which should be unity for time lag zero on the main diagonal and zero elsewhere.

Polynomial QR Decompositions—Classical Gram Schmidt (CGS)

This section provid details regarding embodiments of the invention that utilize the CGS method for polynomial QR decompositions. The columns of the forward prefilter $Q_{fwd}(z^{-1})$ will be denoted $q_k(z^{-1})$, k=1, ..., N, while the columns of the backward prefilter $\tilde{Q}_{bwd}(z^{-1})$ will be denoted $\bar{q}_k(z^{-1})$, k=1, ..., N. It will be shown that the calculations leading to $q_k(z^1)$, k=1, ..., N can be re-used in order to compute efficiently $\bar{q}_k(z^{-1})$, k=1, ..., N. Hence, the joint calculation of the forward and backward prefilters $q_k(z^{-1})$, $\bar{q}_k(z-1)$, k=1, ..., N is only slightly more complex than the calculation of the forward prefilter $q_k(z^{-1})$, k=1, ..., N only.

The first column $q_1(z^{-1})$ of $Q_{fwd}(z^{-1})$ is defined as a normalized version of the first column $h_1(z^{-1})$ of $H(z^{-1})$. This normalization is done with a scalar minimum phase polynomial, i.e. a polynomial with all roots located inside the unit circle. This minimum phase polynomial is calculated from a spectral factorization of the scalar squared second norm of the first column $h_1(z^{-1})$ of $H(z^{-1})$. Denote $$A^{(1)}(z^{-1}) = [a_1^{(1)}(z^{-1}) a_2^{(1)}(z^{-1}) \ldots a_N^{(1)}(z^{-1})] = H(z^{-1}). \quad (14)$$

Then the spectral factorization of the scalar squared second norm of the first column $a_1^{(1)}(z^{-1})$ of $A^{(1)}(z^{-1})$ is calculated from $$s_1(z^{-1}) = a_1^{(1)*T}(z)a_1^{(1)}(z^{-1}) = \sum_{i=1}^{M} a_{i,1}^{(1)*}(z)a_{i,1}^{(1)}(z^{-1}) \quad (15)$$

such that $$a_{MP,1}(z^{-1}) = MinPhaseFactor\{s_1(z^{-1})\}. \quad (16)$$

See below for more details about spectral factorizations.

The inverse of this minimum phase polynomial in (16) is approximated by a FIR polynomial after long division, $$\frac{1}{a_{MP,1}(z^{-1})} \approx a_{MPinv,1}(z^{-1}) = \quad (17)$$

$$a_{MPinv,1,0} + a_{MPinv,1,1}z^{-1} + \ldots + a_{MPinv,1,L_{LD}}z^{-L_{LD}}.$$

Here, the length of the FIR approximation is considered as a design variable which must be selected with care. Now, the first column $q_1(z^{-1})$ of $Q_{fwd}(z^{-1})$ is calculated as $$q_1(z^{-1}) = a_{MPinv,1}(z^{-1})a_1^{(1)}(z^{1}), \quad (18)$$

and $$r_{1,1}(z^{-1}) = a_{MP,1}(z^{-1}). \quad (19)$$

Also, the first column $\bar{q}_1(z^{-1})$ of $Q_{bwd}(z^{-1})$ is calculated as $$\bar{q}_1(z^{-1}) = a^*_{MPinv,1}(z^{-1})z^{-L}a_1^{(1)}(z). \quad (20)$$

From equations (18) and (20) follows that the same FIR approximation of the inverse of the minimum phase spectral factorization is used both for the forward and the backward directions. A proof of such a simplified calculation of the backward direction is given below.

The remaining columns of $Q_{fwd}(z^{-1})$ and $Q_{bwd}(z^{-1})$ should now be calculated. These columns of $Q_{fwd}(z^{-1})$ and $Q_{bwd}(z^{-1})$ will be sequentially calculated, with $k=2, \ldots, N$. Start by setting $k=2$ and calculate column k of $R(z^{-1})$ as the projection of $A^{(k-1)}(z^{-1})$ on the previously calculated column of $Q_{fwd}(z^{-1})$ i.e.

$$r_{j,k}(z^{-1}) = q_j^{*T}(z)a_k^{(k-1)}(z^{-1}) \quad (21)$$

for $j=1, \ldots, k-1$. Use these projections in order to calculate a polynomial vector $a_k^{(k)}(z^{-1})$ as the difference between column k of $A^{(k-1)}(z^{-1})$ and (21) multiplied by previously calculated column of $Q_{fwd}(z^{-1})$ i.e.

$$a_k^{(k)}(z^{-1}) = a_k^{(k-1)}(z^{-1}) - \sum_{j=1}^{k-1} r_{j,k}(z^{-1})q_j(z^{-1}). \quad (22)$$

Column $q_k(z^{-1})$ of $Q_{fwd}(z^{-1})$ is defined as a normalized version of this $a_k^{(k)}(z^{-1})$ for $k \geq 2$. This normalization is done with a scalar minimum phase polynomial $a_{MP,k}(z^{-1})$ which is calculated from a spectral factorization of the squared second norm of the column vector $a_k^{(k)}(z^{-1})$. Denote this squared second norm as $$s_k(z^{-1}) = a_k^{(k)*T}(z)a_k^{(k)}(z^{-1}) = \sum_{i=1}^{M} a_{i,k}^{(k)*}(z)a_{i,k}^{(k)}(z^{-1}). \quad (23)$$

Also denote the minimum phase factor polynomial of (23) as $$a_{MP,k}(z^{-1}) = MinPhaseFactor\{s_k(z^{-1})\}. \quad (24)$$

The inverse of this minimum phase polynomial in (24) is approximated by a FIR polynomial after long division as $$\frac{1}{a_{MP,k}(z^{-1})} \approx a_{MPinv,k}(z^{-1}) = \quad (25)$$

$$a_{MPinv,k,0} + a_{MPinv,k,1}z^{-1} + \ldots + a_{MPinv,k,L_{LD}}z^{-L_{LD}}.$$

Since $a_{MP,k}(z^{-1})$ is minimum phase this FIR approximation is numerically good. Now, column k of $Q_{fwd}(z^{-1})$ is calculated as $$q_k(z^{-1}) = a_{MPinv,k}(z^{-1})a_k^{(k)}(z^{-1}) \quad (26)$$

while column k of $Q_{bwd}(z^{-1})$ is calculated as $$\bar{q}_k(z^{-1}) = a_{MPinv,k}(z^{-1})z^{-L}a_k^{(k)}(z) \quad (27)$$

and $$r_{k,k}(z^{-1}) = a_{MP,k}(z^{-1}). \quad (28)$$

From equations (26) and (27) follows that the same FIR approximation of the inverse of the minimum phase spectral factorization is used both for the forward and the backward directions.

Finally, repeat (21) to (28) for the remaining columns of $Q_{fwd}(z^{-1})$ and $Q_{bwd}(z^{-1})$.

Polynomial QR Decompositions—Modified Gram Schmidt (MGS)

This section provides details regarding embodiments of the invention that utilize the MGS method for polynomial QR decompositions. The notation introduced above for the forward and backward prefilters is used also in this section.

Within the MGS algorithm, the columns $q_k(z^{-1})$ of $Q_{fwd}(z^{-1})$ and $Q_{bwd}(z^{-1})$ are sequentially $(k=1, \ldots, N)$ calculated. Compare with the CGS algorithm where also the columns of $Q_{fwd}(z^{-1})$ and $Q_{bwd}(z^{-1})$ are sequentially calculated. However, while CGS calculates each column of $R(z^{-1})$ sequentially (see equation (21)), the MGS calculates each row of $R(z^{-1})$ sequentially.

First, define the matrix $$A^{(k)}(z^{1}) = [a_1^{(k)}(z^{1}) a_2^{(k)}(z^{1}) \ldots a_N^{(k)}(z^{1})] \quad (29)$$

with $$A^{(1)}(z^{-1}) = H(z^{-1}) \quad (30)$$

For $k=1$, the first column $q_1(z^{-1})$ of $Q_{fwd}(z^{-1})$ is defined as a normalized version of the first column $a_1^{(1)}(z^{-1})$ of $A^{(1)}(z^{-1})$. This normalization is done with the inverse of a scalar minimum phase polynomial $a_{MP,1}(z^{-1})$, i.e. all roots of the polynomial are located inside the unit circle. A minimum phase polynomial is calculated from a spectral factorization of the squared second norm of the first column $a_1^{(1)}(z^{-1})$ of $A^{(1)}(z^{-1})$. Then, a new polynomial matrix $A^{(2)}(z^{-1})$ will be calculated below, in which the projections of $A^{(1)}(z^{-1})$ on this first column of $Q_{fwd}(z^{-1})$ is subtracted. The second column of $Q_{fwd}(z^{-1})$ is then calculated as a normalized version of the second column of this $A^{(2)}(z^{-1})$. The remaining columns of $Q_{fwd}(z^{-1})$ are sequentially calculated in the same fashion.

Below, a description is given for calculating column k of $Q_{fwd}(z^{-1})$ and $Q_{bwd}(z^{-1})$ and row k of $R(z^{-1})$. This description is valid for k=1, ..., N.

Denote the squared second norm of column k of $A^{(k)}(z^1)$ as $$s_k(z^{-1}) = a_k^{(k)*T}(z)a_k^{(k)}(z^{-1}) = \sum_{i=1}^{M} a_{i,k}^{(k)*}(z)a_{i,k}^{(k)}(z^{-1}) \quad (31)$$

Also denote the minimum phase factor polynomial of (31) as $$a_{MP,k}(z^{-1}) = \text{MinPhaseFactor}\{s_k(z^{-1})\}. \quad (32)$$

See below for more details about spectral factorizations.

The inverse of this minimum phase polynomial in (32) is approximated by a FIR polynomial after long division as $$\frac{1}{\alpha_{MP,k}(z^{-1})} \approx \alpha_{MPinv,k}(z^{-1}) = \quad (33)$$

$$\alpha_{MPinv,k,0} + \alpha_{MPinv,k,1}z^{-1} + \ldots + \alpha_{MPinv,k,L_{LD}}z^{-L_{LD}}.$$

Since $a_{MP,k}(z^{-1})$ is minimum phase (all roots inside the unit circle), this FIR approximation is numerically good. Here, the length of the FIR approximation is considered as a design variable which must be selected with care. Now, column k of $Q_{fwd}(z^{-1})$ is calculated as $$q_k(z^{-1}) = a_{MPinv,k}(z^{-1})a_k^{(k)}(z^{-1}) \quad (34)$$

and column k of $Q_{bwd}(z^{-1})$ is calculated as $$\bar{q}_k(z^{-1}) = a^*_{MPinv,k}(z^{-1})z^{-1}a_k^{(k)}(z). \quad (35)$$

The diagonal element in row k and column k of $R(z^{-1})$ is defined as $$r_{k,k}(z^{-1})a_{MP,k}(z^{-1}) \quad (36)$$

and the off-diagonal elements of row k of $R(z^{-1})$ is calculated as $$r_{k,j}(z) = q_k^{*T}(z)a_j^{(k)}(z^{-1}) \quad (37)$$

for j=k+1, ..., N.

In order to proceed with the next columns of $Q_{fwd}(z^{-1})$ and $Q_{bwd}(z^{-1})$, a new polynomial matrix $A^{(k+1)}(z^{-1})$ is defined in which the projections of $A^{(k)}(z^{-1})$ on the recently calculated column k of $Q(z^{-1})$ is subtracted. Thus, define column j of the matrix $A^{(k+1)}(z^{-1})$ for k≥1, as $$a_j^{(k+1)}(z^{-1}) = a_j^{(k)}(z^{-1}) - q_k(z^{-1})r_{k,j}(z^{-1}) \quad (38)$$

for j=k+1, ..., N.

The remaining columns of $Q_{fwd}(z^{-1})$ and $Q_{bwd}(z^{-1})$, are calculated by increasing k and repeat (31) to (38).

Observe from Equations (34) and (35) that the same FIR approximation of the inverse of the minimum phase spectral factorization is used both for the forward and the backward directions. Hence, the joint calculation of the forward and backward prefilters is performed efficiently.

Spectral Factorization

Below follows details regarding spectral factorization that is relevant for both the backward prefilter and the forward prefilter.

Consider the polynomial element in row i and in column j of a polynomial matrix $A(z^{-1})$ $$\alpha_{i,j}(z^{-1}) = \alpha_{i,j,0} + \alpha_{i,j,1}z^{-1} + \quad (39)$$

$$\alpha_{i,j,2}z^{-2} + \ldots + \alpha_{i,j,L}z^{-L}$$

$$= \alpha_{i,j,0} \cdot z^{-L} \prod_{z_m \in Q_{in}^{(i,j)}} (z - z_m) \prod_{z_m \in Q_{out}^{(i,j)}} (z - z_m)$$

where $$z_m \in Q_{in}^{(i,j)} \text{ if } |z_m|^2 < 1 \quad (40)$$

and $$z_m \in Q_{out}^{(i,j)} \text{ if } |z_m|^2 \geq 1 \quad (41)$$

The squared second norm of column k of $A(z^{-1})$ $$s_k(z^{-1}) = \sum_{i=1}^{M} \alpha_{ik}(z^{-1})\alpha_{ik}^*(z) \quad (42)$$

can then be modeled by the individual roots of the elements in $A(z^1)$ $$s_k(z^{-1}) = \sum_{i=1}^{M} \left( \alpha_{i,k,0} \cdot \prod_{z_m \in Q_{in}^{(i,k)}} (z - z_m) \right. \quad (43)$$

$$\left. \prod_{z_m \in Q_{out}^{(i,k)}} (z - z_m) \prod_{z_m \in Q_{in}^{(i,k)}} (z^{-1} - z_m^*) \prod_{z_m \in Q_{out}^{(i,k)}} (z^{-1} - z_m^*) \right)$$

or by the roots of the polynomial $$s_k(z^1) = \quad (44)$$

$$\alpha_k \cdot \prod_{z_m \in Q_{in}^{(k)}} (z - z_m) \prod_{z_m \in Q_{out}^{(k)}} (z - z_m) \prod_{z_m \in Q_{in}^{(k)}} (z^1 - z_m^*) \prod_{z_m \in Q_{out}^{(k)}} (z^1 - z_m^*)$$

where $$z_m \in Q_{in}^{(k)} \text{ if } |z_m|^2 < 1, \quad (45)$$

$$z_m \in Q_{out}^{(k)} \text{ if } |z_m|^2 \geq 1 \quad (46)$$

and $$\alpha_k = \sum_{i=1}^{M} \sum_{m=0}^{L} |\alpha_{i,k,m}|^2.$$

The spectral factorization of $s_k(z^{-1})$ into minimum phase polynomials equals $$s_k(z^{-1}) = a_{MP,k}(z^{-1})a_{MP,k}^*(z). \quad (47)$$

such that $$\alpha_{MP,k}(z^{-1}) = \beta_k \cdot z^{-L} \prod_{z_m \in Q_{in}^{(k)}} (z - z_m) \prod_{z_m \in Q_{out}^{(k)}} (-z_m^*) \left( z - \frac{1}{z_m^*} \right). \quad (48)$$

where $\beta_k = \sqrt{\alpha_k}$. Thus, the polynomial $a_{MP,k}(z^{-1})$ has all roots inside the unit circle. Several algorithms for calculation of this spectral factorization are available. For example, the roots of the polynomial $s_k(z^{-1})$ can be explicitly calculated such that the minimum phase spectral factorization is calculated from (48). Alternatively, the method as described in U.S. Pat. No. 6,826,226 can be used. The process of calculating the minimum phase factor $a_{MP,k}(z^{-1})$ from $s_k(z^1)$ is denoted as $$a_{MP,k}(z^{-1}) = \text{MinPhraseFactor}\{s_k(z^{-1})\} \qquad (49)$$

A minimum phase polynomial in the backward direction equals a maximum phase polynomial in the forward direction, i.e. a polynomial with all roots outside the unit circle. In (47), the spectrum was factorized into one minimum phase polynomial $a_{MP,k}(z^{-1})$ and a maximum phase polynomial $a_{MP,k}^*(z)$. The minimum phase polynomial in the backward direction thus equals $$\bar{a}_{MP,k}(z^{-1}) = a_{MP,k}^*(z) \qquad (50)$$

Proof of Simplified Calculation of Backward Filter

One straightforward way to calculate $Q_{bwd}(z^{-1})$ is to repeat the same type of calculations in both the forward and the backward directions, i.e. use CGS or MGS for both $H_{fwd}(z^{-1})$ in (11) and $H_{bwd}(z^{-1})$ in (12). However, a proof will be given below of how to reuse calculations done for $Q_{fwd}(z^{-1})$ when calculating $Q_{bwd}(z^{-1})$.

Denote $$\bar{A}^{(1)}(z^{-1}) = [\bar{a}_1^{(1)}(z^{-1}) \bar{a}_2^{(1)}(z^{-1}) \ldots \bar{a}_N^{(1)}(z^{-1})] = H_{bwd}(z^{-1}) \qquad (51)$$

where $H_{bwd}(z^{-1})$ is defined in (12) such that $$\bar{A}^{(1)}(z^{-1}) = z^{-L} A^{(1)}(z^{-1}). \qquad (52)$$

Within both CGS and MGS, the first column of $Q_{fwd}(z^{-1})$ is calculated as the first column of $\bar{A}^{(1)}(z^{-1})$ normalized with the inverse of $\bar{a}_{MP,1}(z^{-1})$, i.e.

$$\bar{q}_1(z^{-1}) = \bar{a}_{MPinv,1}(z^{-1}) \bar{a}_1^{(1)}(z^{-1}) \qquad (53)$$
$$= \alpha_{MPinv,1}^*(z) z^{-L} \alpha_1^{(1)}(z)$$

where the inverse of this minimum phase polynomial in (50) is approximated by a FIR polynomial after long division as $$\frac{1}{\bar{\alpha}_{MP,k}(z^{-1})} \approx \bar{\alpha}_{MPinv,k}(z^{-1}) = \alpha_{MPinv,k}^*(z). \qquad (54)$$

Thus, the first column of $Q_{bwd}(z^{-1})$ can be calculated by using the same spectral factorization and long division results as used in the forward direction. This is valid for both CGS and MGS.

Below, separate motivations will be given of how to calculate the remaining columns of $Q_{bwd}(z^{-1})$, starting with CGS and continuing with MGS.

CGS

The columns of $Q_{bwd}(z^{-1})$ will be sequentially calculated, for $k=2, \ldots, N$.

Start with $k=2$ and calculate the projection of column k of $\bar{A}^{(k-1)}(z^1)$, denoted by $\bar{a}_k^{(k-1)}(z^{-1})$, on the previously calculated column of $Q_{bwd}(z^{-1})$ i.e.

$$\bar{r}_{j,k}(z^{-1}) = \bar{q}_j^{*T}(z) \bar{a}_k^{(k-1)}(z^{-1}) \qquad (55)$$
$$= \frac{\alpha_j^{(k-1)*T}(z^{-1}) z^L \alpha_{MPinv,j}(z^{-1})}{\bar{q}_j^{*T}(z)} \cdot \frac{z^{-L} a_k^{(k-1)}(z)}{\bar{\alpha}_k^{(k-1)}(z^{-1})}$$

for $j=1, \ldots, k-1$, compare with (21). This is followed by a calculation of column k of the matrix $\bar{A}^{(k)}(z^{-1})$ as $$\bar{\alpha}_k^{(k)}(z^{-1}) = \bar{\alpha}_k^{(k1)}(z^1) - \sum_{j=1}^{k-1} \bar{r}_{j,k}(z^1) \bar{q}_j(z^1) \qquad (56)$$

$$= z^{-L} \alpha_k^{(k-1)}(z) - \sum_{j=1}^{k-1} \frac{\alpha_j^{(k-1)*T}(z^{-1}) \alpha_{MPinv,j}(z^{-1}) \alpha_k^{(k-1)}(z)}{r_{j,k}(z^{-1})}$$

$$\frac{\alpha_{MPinv,j}^*(z) z^{-L} \alpha_j^{(j)}(z),}{\bar{q}_j(z^{-1})}$$

compare with (22). This formulation of $\bar{a}_k^{(k)}(z^{-1})$ will now be compared to corresponding expression for $a_k^{(k)}(z^{-1})$. Inserting (18) or (26) into (21) results in $$r_{j,k}(z^{-1}) = a_j^{(j)*T}(z) a_{MPinv,j}(z) a_k^{(k-1)}(z^{-1}) \qquad (57)$$

Now, inserting (57) into (22) results in $$\alpha_k^{(k)}(z^{-1}) = \alpha_k^{(k-1)}(z^{-1}) - \sum_{j=1}^{k-1} r_{j,k}(z^{-1}) q_j(z^{-1}) \qquad (58)$$

$$= \alpha_k^{(k-1)}(z^{-1}) - \sum_{j=1}^{k-1} \frac{\alpha_j^{(k-1)*T}(z) \alpha_{MPinv,j}^*(z) \alpha_k^{(k-1)}(z)}{r_{j,k}(z^{-1})}$$

$$\frac{\alpha_{MPinv,j}^*(z^{-1}) \alpha_j^{(j)}(z^{-1}).}{q_j(z^{-1})}$$

By comparing (56) and (58) it follows that $$\bar{a}_k^{(k)}(z^{-1}) = z^{-L} a_k^{(k)}(z) \qquad (59)$$

or, $\bar{A}(z^1) = z^L A(z)$. This relation can be used such that (55) and (56) do not have to be explicitly calculated in the backward direction. Instead, the columns of $Q_{bwd}(z^{-1})$ are directly calculated from the right hand side of $$\bar{q}_k(z^{-1}) = \bar{a}_{MPinv,k}(z^{-1}) \bar{a}_k^{(k)}(z^{-1}) = a_{MPinv,k}^*(z) z^L a_k^{(k)}(z). \qquad (60)$$

MGS

The columns of $Q_{bwd}(z^{-1})$ are sequentially calculated, with $k=1, \ldots, N$. The first column of $Q_{bwd}(z^{-1})$ was calculated in (53). Expressions of how to calculate the remaining columns of $Q_{bwd}(z^{-1})$ are derived below.

Start with $k=1$ and calculate the projection of column k of $\bar{A}^{(k)}(z^1)$, denoted by $\bar{a}_k^{(k)}(z^{-1})$ on the previously calculated column of $Q_{bwd}(z^{-1})$ i.e.

$$\bar{r}_{k,j}(z^1) = \bar{q}_k^{*T}(z) \bar{\alpha}_j^{(k)}(z^1) \qquad (61)$$

$$= \frac{\alpha_k^{(k)*T}(z^{-1}) z^L \alpha_{MPinv,k}(z^{-1})}{\bar{q}_k^{*T}(z)} \cdot \frac{z^{-L} a_j^{(k)}(z)}{\bar{\alpha}_j^{(k)}(z^{-1})}$$

for $j=k+1, \ldots, N$, compare with (37). This is the followed by calculations of columns $j=k+1, \ldots, N$ of the matrix $\bar{A}^{(k)}(z^{-1})$ as $$\bar{\alpha}_j^{(k+1)}(z^{-1}) = \bar{\alpha}_j^{(k)}(z^{-1}) - \bar{q}_k(z^{-1}) \bar{r}_{k,j}(z^{-1}) \qquad (62)$$

$$= z^{-L} \alpha_k^{(k)}(z) - \frac{\alpha_{MPinv,k}^*(z) z^{-L} \alpha_k^{(k)}(z)}{r_{j,k}(z^{-1})}$$

-continued
$$\underbrace{\alpha_k^{(k)*T}(z^{-1})z^L\alpha_{MPinv,k}(z^{-1})z^{-L}\alpha_j^{(k)}(z)}_{r_{k,j}(z^{-1})},$$

compare with (38). This formulation of $\bar{a}_k^{(k+1)}(z^{-1})$ will now be compared to corresponding expression for $a_k^{(k+1)}(z^{-1})$. Inserting (34) into (37) results in $$r_{k,j}(z^{-1})-a^*_{MPinv,k}(z)a_k^{(k)*T}(z)a_j^{(k)}(z^{-1}) \qquad (63)$$

Now, inserting (34) and (63) into (38) results in $$\alpha_j^{(k+1)}(z^{-1}) = \alpha_j^{(k)}(z^{-1}) - q_k(z^{-1})r_{k,j}(z^{-1}) \qquad (64)$$
$$= \alpha_k^{(k)}(z^{-1}) - \underbrace{\frac{\alpha_{MPinv,k}(z^{-1})\alpha_k^{(k)}(z^{-1})}{q_k(z^{-1})}}$$

-continued
$$\underbrace{\alpha^*_{MPinv,k}(z)\alpha_k^{(k)*T}(z)\alpha_j^{(k)}(z^{-1})}_{r_{k,j}(z^{-1})}.$$

By comparing (62) and (64) it follows that $$\bar{a}_k^{(k)}(z^{-1})=z^{-L}a_k^{(k)}(z) \qquad (65)$$

or, $\overline{A}(z^1)=z^{-L}A(z)$. This relation can be used such that (62) and (63) do not have to be explicitly calculated in the backward direction. Instead, the columns of $Q_{bwd}(z^{-1})$ are directly calculated from the right hand side of $$\bar{q}_k(z^{-1})=\bar{a}_{MPinv,k}(z^{-1})$$
$$\bar{a}_{k\ ik}^{(k)}(z^{-1})=a^*_{MPinv,k}(z)z^{-L}a_k^{(k)}(z). \qquad (66)$$

Polynomial Truncation

The polynomial multiplications included in the Classical Gram Schmidt algorithm are listed in table 1. The polynomial channel matrix $H(z^{-1})$ is used as input.

TABLE 1

| Polynomial operation | Minimum power of $z^{-1}$ | | Maximum power of $z^{-1}$ | |
|---|---|---|---|---|
| | Unconstrained | Truncated | Unconstrained | Truncated |
| $s_1(z^{-1}) = h_1(z^{-1})h_1^{*T}(z) = \sum_{i=1}^{M} h_{i1}(z^{-1})h_{i1}^*(z)$ | $-L$ | | $L$ | |
| $h_{MP,1}(z^{-1}) = \text{MinPhaseFactor}\{s_1(z^{-1})\}$ | 0 | | $L$ | |
| $\frac{1}{h_{MP,1}(z^{-1})} \approx h_{MPinv,1}(z^{-1})$ | 0 | | $L_{LD}$ | |
| $q_{i,1}(z^{-1}) = h_{MPinv,1}(z^{-1})h_{i1}(z^{-1})$ | 0 | $-L_{Qnc}$ | $L_{LD}+L$ | $L_{Qc}$ |
| $r_{1,1}(z^{-1}) = h_{MP,1}(z^{-1})$ | 0 | $-L_{Rnc}$ | $L$ | $L_{Rc}$ |
| $r_{j,k}(z) = q_j^{*T}(z)h_k(z^{-1})$ | $-L_{Qc}$ | $-L_{Rnc}$ | $L_{Qnc}+L$ | $L_{Rc}$ |
| $a_k(z^{-1}) = h_k(z^{-1}) - \sum_{i=1}^{k-1} r_{i,k}(z^{-1})q_i(z^{-1})$ | $-L_{Rnc}-L_{Qnc}$ | $-L_{Anc}$ | $L_{Rc}+L_{Qc}$ | $L_{Ac}$ |
| $s_k(z^{-1}) = a_k^{*T}(z)a_k(z^{-1}) = \sum_{i=1}^{M} a_{i,k}^*(z)a_{i,k}(z^{-1})$ | $-L_{Ac}-L_{Anc}$ | | $L_{Anc}+L_{Ac}$ | |
| $a_{MP,k}(z^{-1}) = \text{MinPhaseFactor}\{s_k(z^{-1})\}$ | 0 | | $L_{Anc}+L_{Ac}$ | |
| $r_{k,k}(z^{-1}) = a_{MP,k}(z^{-1})$ | 0 | $-L_{Rnc}$ | $L_{Anc}+L_{Ac}$ | $L_{Rc}$ |
| $\frac{1}{a_{MP,k}(z^{-1})} \approx a_{MPinv,k}(z^{-1})$ | 0 | | $L_{LD}$ | |
| $q_{i,k}(z^{-1}) = a_{MPinv,k}(z^{-1})a_{i,k}(z^{-1})$ | $-L_{Anc}$ | $-L_{Qnc}$ | $L_{LD}+L_{Ac}$ | $L_{Qc}$ |

The polynomial multiplications included in the Modified Gram Schmidt algorithm are listed in table 2. As input to this algorithm, the matrix $A^{(1)}(z^{-1})$ is defined as $A^{(1)}(z^{-1})=H(z^{-1})$.

TABLE 2

| Polynomial operation | Minimum power of $z^{-1}$ | | Maximum power of $z^{-1}$ | |
|---|---|---|---|---|
| | Unconstrained | Truncated | Unconstrained | Truncated |
| $s_k(z^{-1}) = a_k^{(k)}(z^{-1})a_k^{(k)*T}(z)$ | $-L_{Anc}-L_{Ac}$ | | $L_{Ac}+L_{Anc}$ | |
| $a_{MP,k}(z^{-1}) = \text{MinPhaseFactor}\{s_k(z^{-1})\}$ | 0 | | $L_{Ac}+L_{Anc}$ | |

TABLE 2-continued

| Polynomial operation | Minimum power of $z^{-1}$ | | Maximum power of $z^{-1}$ | |
|---|---|---|---|---|
| | Unconstrained | Truncated | Unconstrained | Truncated |
| $\frac{1}{a_{MP,k}(z^{-1})} \approx a_{MPinv,k}(z^{-1})$ | 0 | | $L_{LD}$ | |
| $q_{i,k} = a_{MPinv,k}(z^{-1})a_{ik}^{(k)}(z^{-1})$ | $-L_{Anc}$ | $-L_{Qnc}$ | $L_{LD} + L_{Ac}$ | $L_{Qc}$ |
| $r_{k,k}(z^{-1}) = a_{MP,k}(z^{-1})$ | 0 | $-L_{Rnc}$ | $L_{Ac}$ | $L_{Rc}$ |
| $r_{k,j}(z) = q_k^{*T}(z)a_k^{(k)}(z^{-1})$ | $-L_{Qc} - L_{Anc}$ | $-L_{Rnc}$ | $L_{Qnc} + L_{Ac}$ | $L_{Rc}$ |
| $a_j^{(k+1)}(z^{-1}) \triangleq a_j^{(k)}(z^{-1}) - q_k(z^{-1})r_{k,j}(z^{-1})$ | $-L_{Qnc} - L_{Rnc}$ | $-L_{Anc}$ | $L_{Qc} + L_{Rc}$ | $L_{Ac}$ |

The polynomial degree for each polynomial multiplication in CGS and MGS are given in table 1 and table 2, respectively. Here the minimum power of $z^{-1}$ and maximum power of $z^{-1}$ are listed as functions of the degrees of the polynomials involved in the multiplications. These values are referred to as unconstrained. A convention is also included in table 1 and table 2 of the polynomial powers after multiplication. If the introduced polynomial degree is smaller than the unconstrained value, then the result of the polynomial multiplication is truncated.

The parameters $L_{Qnc}$, $L_{Qc}$, $L_{Rnc}$, $L_{Rc}$, $L_{Anc}$, and $L_{Ac}$ are design variables, which should be selected with care.

The invention claimed is:

1. A method in a radio receiver for demodulating data signals transmitted by a plurality of transmitting antennas over a radio channel, the method comprising:
   receiving, on a plurality of receiving antennas, at least a first data signal, a second data signal and a reference signal, the first data signal being received prior to the reference signal and the second data signal being received subsequent to the reference signal, the contents of the reference signal being known a priori to the receiver;
   calculating, using the contents of the reference signal, an estimated polynomial channel matrix;
   calculating, using the contents of the reference signal, a time-reversed estimated polynomial channel matrix;
   decomposing the estimated polynomial channel matrix, the decomposing comprising a joint calculation of:
      a decomposition of the estimated polynomial channel matrix into a product of a first paraunitary polynomial matrix and a first upper triangular polynomial matrix with minimum-phase filters on its main diagonal, and
      a decomposition of the time-reversed estimated polynomial channel matrix into a product of a second paraunitary polynomial matrix and a second upper triangular polynomial matrix with said minimum-phase filters on its main diagonal;
   calculating a first polynomial pre-filter matrix as the paraconjugate of the first paraunitary polynomial matrix;
   calculating a second polynomial pre-filter matrix as the paraconjugate of the second paraunitary polynomial matrix;
   demodulating the received first data signal where the received first data signal is time-reversed and multiplied with the calculated second polynomial pre-filter matrix; and
   demodulating the received second data signal where the received second data signal is multiplied with the calculated first polynomial pre-filter matrix.

2. The method of claim 1, comprising:
   calculating a first pre-filtered polynomial channel matrix by multiplying the estimated polynomial channel matrix with the first polynomial pre-filter matrix, thereby making the first pre-filtered polynomial channel matrix upper triangular and with minimum-phase filters on its main diagonal;
   calculating a second pre-filtered polynomial channel matrix by multiplying the time-reversed estimated polynomial channel matrix with the second polynomial pre-filter matrix, thereby making the second pre-filtered polynomial channel matrix upper triangular and with minimum-phase filters on its main diagonal; and
   where the demodulation of the received data signals further comprises:
      using the second pre-filtered polynomial channel matrix as the channel model in the demodulation of the time-reversed first data signal, and
      using the first pre-filtered polynomial channel matrix as the channel model in the demodulation of the second data signal.

3. The method of claim 1, wherein the decomposition of the estimated polynomial channel matrix comprises:
   assigning, to an auxiliary polynomial matrix, the estimated polynomial channel matrix;
   assigning, to the first column of the first paraunitary polynomial matrix, a normalized version of the first column of the auxiliary polynomial matrix;
   assigning, to the first column of the second paraunitary polynomial matrix, a normalized version of the time-reversed first column of the auxiliary polynomial matrix; and,
   for each current column from a second column to a last column:
      calculating projections of the current column of the auxiliary matrix on the previous columns of the first paraunitary polynomial matrix,
      calculating a difference polynomial vector as the difference between the current column of the auxiliary matrix and a product of the calculated projections multiplied by the previous columns of the first paraunitary polynomial matrix, and
      assigning, to the current column of the first paraunitary polynomial matrix, a normalized version of the calculated difference polynomial vector, and
      assigning, to the current column of the second paraunitary polynomial matrix, a normalized version of the time-reversed calculated difference polynomial vector.

4. The method of claim 3, wherein:
the normalization of the first column of the auxiliary polynomial matrix is performed by normalizing with an inverse of a first scalar minimum-phase polynomial;
the normalization of the respective calculated difference polynomial vectors is performed by normalizing with an inverse of a respective current scalar minimum-phase polynomial;
the normalization of the time-reversed first column of the auxiliary polynomial matrix is performed by normalizing with the complex conjugate of an inverse of a first scalar minimum-phase polynomial; and
the normalization of the respective time-reversed calculated difference polynomial vectors is performed by normalizing with the complex conjugate of an inverse of a respective current scalar minimum-phase polynomial.

5. The method of claim 4, wherein the first scalar minimum-phase polynomial is obtained by:
calculating a spectral factorization of the squared second norm of the first column of the estimated polynomial channel matrix, and
the respective current scalar minimum-phase polynomial is obtained by:
calculating a spectral factorization of the squared second norm of the current difference polynomial vector.

6. The method of claim 4, wherein the normalizations comprise approximating the inverse of the scalar minimum-phase polynomials with a respective finite impulse response polynomial after long division.

7. The method of claim 1, wherein the decomposition of the estimated polynomial channel matrix comprises:
assigning, to an auxiliary polynomial matrix, the elements of the estimated polynomial channel matrix; and,
for each current column from a first column to a last column:
assigning, to the current column of the first paraunitary polynomial matrix, a normalized version of the current column of the auxiliary polynomial matrix,
assigning, to the current column of the second paraunitary polynomial matrix, a normalized version of the time-reversed current column of the auxiliary polynomial matrix,
calculating projections of the auxiliary polynomial matrix on the current column of the first paraunitary polynomial matrix,
updating the auxiliary polynomial matrix by subtracting a product of the current column of the first paraunitary polynomial matrix and the calculated projections from the auxiliary polynomial matrix.

8. The method of claim 7, wherein the normalization of the columns of the auxiliary polynomial matrix is performed by normalizing with an inverse of a respective current scalar minimum-phase polynomial and wherein the normalization of the time-reversed auxiliary polynomial matrix is performed by normalizing with the complex conjugate of an inverse of a respective current scalar minimum-phase polynomial.

9. The method of claim 8, wherein the respective current scalar minimum-phase polynomial is obtained by calculating a spectral factorization of the squared second norm of the current column of the auxiliary polynomial matrix.

10. The method of claim 8, wherein the normalizations comprise approximating the inverse of the scalar minimum-phase polynomials with a respective finite impulse response polynomial after long division.

11. A radio receiver for demodulating data signals transmitted by a plurality of transmitting antennas over a radio channel, the receiver comprising control and communication circuitry configured to:
receive, on a plurality of receiving antennas, at least a first data signal, a second data signal and a reference signal, the first data signal being received prior to the reference signal and the second data signal being received subsequent to the reference signal, the contents of the reference signal being known a priori to the receiver;
calculate, using the contents of the reference signal, an estimated polynomial channel matrix;
calculate, using the contents of the reference signal, a time-reversed estimated polynomial channel matrix;
decompose the estimated polynomial channel matrix, the decomposing comprising a joint calculation of:
a decomposition of the estimated polynomial channel matrix into a product of a first paraunitary polynomial matrix and a first upper triangular polynomial matrix with minimum-phase filters on its main diagonal, and
a decomposition of the time-reversed estimated polynomial channel matrix into a product of a second paraunitary polynomial matrix and a second upper triangular polynomial matrix with said minimum-phase filters on its main diagonal;
calculate a first polynomial pre-filter matrix as the paraconjugate of the first paraunitary polynomial matrix;
calculate a second polynomial pre-filter matrix as the paraconjugate of the second paraunitary polynomial matrix;
demodulate the received first data signal where the received first data signal is time-reversed and multiplied with the calculated second polynomial pre-filter matrix; and
demodulate the received second data signal where the received second data signal is multiplied with the calculated first polynomial pre-filter matrix.

12. The radio receiver of claim 11, where the control and communication circuitry is further configured to:
calculate a first pre-filtered polynomial channel matrix by multiplying the estimated polynomial channel matrix with the first polynomial pre-filter matrix, thereby making the first pre-filtered polynomial channel matrix upper triangular and with minimum-phase filters on its main diagonal;
calculate a second pre-filtered polynomial channel matrix by multiplying the time-reversed estimated polynomial channel matrix with the second polynomial pre-filter matrix, thereby making the second pre-filtered polynomial channel matrix upper triangular and with minimum-phase filters on its main diagonal; and
where the control and communication circuitry is configured to demodulate the received data signals by:
using the second pre-filtered polynomial channel matrix as the channel model in the demodulation of the time-reversed first data signal, and
using the first pre-filtered polynomial channel matrix as the channel model in the demodulation of the second data signal.

13. The radio receiver of claim 11, where the control and communication circuitry is further configured to:
assign, to an auxiliary polynomial matrix, the estimated polynomial channel matrix;
assign, to the first column of the first paraunitary polynomial matrix, a normalized version of the first column of the auxiliary polynomial matrix;

assign, to the first column of the second paraunitary polynomial matrix, a normalized version of the time-reversed first column of the auxiliary polynomial matrix; and, for each current column from a second column to a last column:

calculate projections of the current column of the auxiliary matrix on the previous columns of the first paraunitary polynomial matrix, calculate a difference polynomial vector as the difference between the current column of the auxiliary matrix and a product of the calculated projections multiplied by the previous columns of the first paraunitary polynomial matrix, and assign, to the current column of the first paraunitary polynomial matrix, a normalized version of the calculated difference polynomial vector, and assign, to the current column of the second paraunitary polynomial matrix, a normalized version of the time-reversed calculated difference polynomial vector.

14. The radio receiver of claim 11, where the control and communication circuitry is further configured to:

assign, to an auxiliary polynomial matrix, the elements of the estimated polynomial channel matrix; and for each current column from a first column to a last column:

assign, to the current column of the first paraunitary polynomial matrix, a normalized version of the current column of the auxiliary polynomial matrix, assign, to the current column of the second paraunitary polynomial matrix, a normalized version of the time-reversed current column of the auxiliary polynomial matrix, calculate projections of the auxiliary polynomial matrix on the current column of the first paraunitary polynomial matrix, update the auxiliary polynomial matrix by subtracting a product of the current column of the first paraunitary polynomial matrix and the calculated projections from the auxiliary polynomial matrix.

15. A non-transitory computer-readable medium comprising, stored thereupon, a computer program product comprising software instructions that, when executed in a processor in a radio receiver, cause the radio receiver to demodulate data signals transmitted by a plurality of transmitting antennas over a radio channel according to a process that comprises:

receiving, on a plurality of receiving antennas, at least a first data signal, a second data signal and a reference signal, the first data signal being received prior to the reference signal and the second data signal being received subsequent to the reference signal, the contents of the reference signal being known a priori to the receiver;

calculating, using the contents of the reference signal, an estimated polynomial channel matrix;

calculating, using the contents of the reference signal, a time-reversed estimated polynomial channel matrix;

decomposing the estimated polynomial channel matrix, the decomposing comprising a joint calculation of:

a decomposition of the estimated polynomial channel matrix into a product of a first paraunitary polynomial matrix and a first upper triangular polynomial matrix with minimum-phase filters on its main diagonal, and a decomposition of the time-reversed estimated polynomial channel matrix into a product of a second paraunitary polynomial matrix and a second upper triangular polynomial matrix with said minimum-phase filters on its main diagonal;

calculating a first polynomial pre-filter matrix as the paraconjugate of the first paraunitary polynomial matrix;

calculating a second polynomial pre-filter matrix as the paraconjugate of the second paraunitary polynomial matrix;

demodulating the received first data signal where the received first data signal is time-reversed and multiplied with the calculated second polynomial pre-filter matrix; and demodulating the received second data signal where the received second data signal is multiplied with the calculated first polynomial pre-filter matrix.

* * * * *